United States Patent
Viol et al.

(10) Patent No.: US 11,914,637 B2
(45) Date of Patent: Feb. 27, 2024

(54) IMAGE SCALING CLOUD DATABASE

(71) Applicant: SAP SE, Walldorf (DE)

(72) Inventors: Markus Viol, Walldorf (DE); Rick Weigel, Rheinstetten (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/873,008

(22) Filed: Jul. 25, 2022

(65) Prior Publication Data

US 2024/0028640 A1 Jan. 25, 2024

(51) Int. Cl.
*G06F 16/55* (2019.01)
*G06F 16/51* (2019.01)

(52) U.S. Cl.
CPC ............. *G06F 16/55* (2019.01); *G06F 16/51* (2019.01)

(58) Field of Classification Search
CPC ................................ G06F 16/55; G06F 16/51
USPC .......................................................... 707/740
See application file for complete search history.

(56) References Cited

U.S. PATENT DOCUMENTS

| | | | | |
|---|---|---|---|---|
| 7,305,713 B1 * | 12/2007 | Crance | ................... | H04L 67/06 |
| | | | | 726/32 |
| 7,539,976 B1 * | 5/2009 | Ousterhout | ............... | G06F 8/71 |
| | | | | 717/121 |
| 9,256,467 B1 * | 2/2016 | Singh | .................... | G06F 9/5077 |
| 9,860,569 B1 * | 1/2018 | Wilms | ............. | H04N 21/23418 |
| 11,113,235 B1 * | 9/2021 | O'Connell | .......... | G06F 16/1873 |
| 11,392,399 B2 * | 7/2022 | Kirmse | ............... | G06F 11/1471 |
| 11,481,243 B1 * | 10/2022 | Wang | ...................... | G06F 9/547 |
| 11,734,307 B2 * | 8/2023 | Dageville | ............... | A61F 5/566 |
| | | | | 707/770 |
| 2008/0126369 A1 | 5/2008 | Ellard | | |
| 2018/0349199 A1 * | 12/2018 | Vyas | ................... | G06F 11/3006 |

(Continued)

FOREIGN PATENT DOCUMENTS

| | | | | | |
|---|---|---|---|---|---|
| CN | 105763628 A | * | 7/2016 | ............ | H04L 67/06 |
| CN | 113746887 A | * | 12/2021 | | |

(Continued)

OTHER PUBLICATIONS

Abranches et al., "An Algorithm Based on Response Time and Traffic Demands to Scale Containers on a Cloud Computing System", 2016 IEEE 15th International Symposium on Network Computing and Applications, IEEE, 2016, pp. 343-350. (Year: 2016).*

(Continued)

*Primary Examiner* — Phuong Thao Cao (74) *Attorney, Agent, or Firm* — Fountainhead Law Group P.C.

(57) ABSTRACT

An application executing on a pod may generate a content request for a particular version of content. The application sends a request including an identifier of the version of the content to a repository in a cluster of pods. The repository determines, using the identifier, whether the version of the content is stored in the cluster or stored at a database in a different cluster. The application receives a response from the repository that may indicate that the version of the content is stored in the cluster and the response may include an identifier of a content pod storing the version of the content. The application sends the content request to the content pod storing the version of the content and may receive the version of the content without querying the database for the version of the content.

20 Claims, 5 Drawing Sheets

(56) References Cited

U.S. PATENT DOCUMENTS

| | | | |
|---|---|---|---|
| 2020/0042364 A1* | 2/2020 | Kumar Shimoga Manjunatha | H04L 41/0893 |
| 2020/0136933 A1* | 4/2020 | Raskar | H04L 41/0806 |
| 2020/0301801 A1* | 9/2020 | Hegde | G06F 11/302 |
| 2020/0396309 A1* | 12/2020 | Wang | G06F 8/4442 |
| 2021/0072966 A1* | 3/2021 | Zong | H04L 67/60 |
| 2021/0089570 A1* | 3/2021 | Hunter | G06F 18/21 |
| 2021/0132974 A1* | 5/2021 | Watt, Jr. | G06F 9/4856 |
| 2021/0240540 A1* | 8/2021 | Wang | G06F 9/45558 |
| 2022/0138156 A1* | 5/2022 | Wang | H04L 67/10 707/740 |
| 2022/0147517 A1* | 5/2022 | Rupprecht | G06F 16/11 |
| 2022/0357954 A1* | 11/2022 | Adam | G06F 8/30 |
| 2022/0357995 A1* | 11/2022 | Moussaoui | G06F 9/5033 |

FOREIGN PATENT DOCUMENTS

| | | | | |
|---|---|---|---|---|
| CN | 113783922 A | * | 12/2021 | |
| CN | 113918270 A | * | 1/2022 | |
| CN | 111031129 B | * | 4/2022 | H04L 61/2007 |
| CN | 114697231 A | * | 7/2022 | H04L 61/2007 |
| KR | 20110104697 A | | 9/2011 | |
| WO | WO-2019083570 A1 | * | 5/2019 | H04N 21/2187 |

OTHER PUBLICATIONS

Nguyen et al., "Horizontal Pod Autoscaling in Kubernetes for Elastic Container Orchestration", Sensor (Basel), 2020, 20(16): 4621, doi: 10.3390/s20164621, 18 pages. (Year: 2020).*

Xiongpai Qin et al.: "DB Facade: A Web Cache with Improved Data Freshness", Electronic Commerce and Security, 2009. ISECS '09. Second International Symposium on, IEEE, Piscataway, NJ, USA, May 22, 2009 (May 22, 2009), pp. 483-487, XP031536642, ISBN: 978-0-7695-3643-9.

Luksa Marko: "Kubernetes in action", Dec. 1, 2017 (Dec. 1, 2017), pp. 1-400, XP093011357, ISBN: 978-1-61729-372-6 Retrieved from the Internet: URL:http://sutlib2.sut.ac.th/sut_contents/H173702.pdf [retrieved on Jan. 3, 2023].

Kelsey Hightower et al.: "Kubernetes Up & Running", Sep. 1, 2017 (Sep. 1, 2007), pp. 1-235, XP055704834, Retrieved from the Internet: URL:https://github.com/PegasusWang/books-1/blob/master/dev-ops/kubernetes/kubernetes-up-running.pdf [retrieved on Jun. 15, 2020].

Woodward Christopher: "ThinkMicroservices.com—Object Storage, Minio, and Kubernetes", Sep. 30, 2021 (Sep. 30, 2021), pp. 1-45, XP093106715, Retrieved from the Internet: URL:http://thinkmicroservices.com/blog/2021/object-storage/object-storag•• minio-kubernetes.html [retrieved on Nov. 28, 2023].

Woodward Christopher: "ThinkMicroservices.com—Object Caching, Redis, and Kubernetes", Mar. 15, 2022 (Mar. 15, 2022), pp. 1-28, XP093106717, Retrieved from the Internet: URL:http://thinkmicroservices.com/blog/2022/object-caching/object• caching-redis-kubernetes.html [retrieved on Nov. 29, 2023].

Pattnaik Deeptiman: "A Data Caching Service in Kubernetes | by Deeptiman Pattnaik | Medium", Sep. 30, 2020 (Sep. 30, 2020), pp. 1-17, XP093107058, Retrieved from the Internet: URL:https://codingpirate.com/a-data-caching-service-in• kubernetes-1 e9dbcdb8f91 [retrieved on Nov. 29, 2023].

* cited by examiner

IMAGE SCALING CLOUD DATABASE

BACKGROUND

The present disclosure pertains to databases and in particular to image scaling techniques in cloud databases.

A software application can be deployed as "container," which is a decoupled virtualization environment that executes the application's program code and also contains configurations, dependencies, libraries, filesystems, and other elements used to run the application. A container may be executed by a cloud or non-cloud environment and by a variety of operating systems. An "image" is a template having instructions that may be used to build any number of containers based on that image. A container is thus an executable instance of an image. Container-based software deployment may be advantageous as it virtualizes computer processing, memory, storage, and network resources at the operating system level such that these resources can be shared among applications. These property of containers may provide scalability and improved resource utilization compared to traditional server-based software applications. Containers may also provide advantages over virtual machines in that the operating system resources may be shared among various applications.

Cloud platforms utilizing container-based software application can utilize a container framework for container deployment, clustering, and management. The framework can handle load balancing, storage mounting and orchestration, container creation and removal, and CPU and memory allocation, for example. The cloud platform may include a plurality of "nodes" which may be grouped into "clusters." A node refers to a machine (physical or virtual) that has a runtime for executing one or more containers. A node can also run a "pod," which is a group of one or more containers that share storage and have an IP address within the cluster. The node also communicates with the framework such that the node and its containers may be managed.

The framework can determine whether to replicate pods, using the image, in response to load or demand. The framework can deploy the pod to particular nodes having resources available to execute the new pods. The framework can also detect when demand has subsided and remove pods to free up resources on the nodes. Such pods may be removed from service when demand lowers. This scalability enables efficient use of computing resources.

In some situations the applications run on a pod of a cluster may access information from a database, which may operate in a different cluster over a network connection. Network latency and database processing power are some of the considerations that determine whether a database can handle requests for information in a timely manner. The potential for a bottleneck at the database may increase in situations where the container framework creates additional pods in response to increased application demand, which then results in additional applications making requests to the database. Traditionally, a database may not be executable as a container and may not be replicated or scaled as containers are. That is, while the number of application containers and their overall processing power may scale with demand over time, the processing power available to the database typically is not scalable or not scalable to the extent that containers are scalable. To address this potentially bottleneck issue the processing power of the database may be increased to handle peak loads using additional or faster hardware. However, simply using additional or faster hardware is costly and is also an inefficient utilization of resources during non-peak demand time.

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to generate, by an application executing on a pod in a container, a content request for a particular version of content. The container may be an instance of an image executable by the pod. The pod may be in a cluster comprising a plurality of pods. The image may be usable to generate replicas of the container for executing the application. The instructions may be further executable by the one or more processors to send, by the application, a request including an identifier of the version of the content to a repository in the cluster. The repository may determine, using the identifier, whether the version of the content is stored in the cluster or stored at a database in a different cluster. The instructions may be further executable by the one or more processors to receive, by the application, a response from the repository. The response may indicate that the version of the content is stored in the cluster and the response may include an identifier of a content pod storing the version of the content. The instructions may be further executable by the one or more processors to send, by the application, the content request to the content pod storing the version of the content. The instructions may be further executable by the one or more processors to receive, by the application, the version of the content, the version of the content being received by the application without querying the database for the version of the content.

Some embodiments provide one or more non-transitory computer-readable medium storing computer program code comprising sets of instructions. The computer program code may include sets of instructions to generate, by an application executable on a pod in a container, a content request for a particular version of content. The container may be an instance of an image executable by the pod. The pod being in a cluster comprising a plurality of pods, the image usable to generate replicas of the container for executing the application. The computer program code may further include sets of instructions to send, by the application, a request including an identifier of the version of the content to a repository in the cluster. The repository may determine, using the identifier, whether the version of the content is stored in the cluster or stored at a database in a different cluster. The computer program code may further include sets of instructions to receive, by the application, a response from the repository. The response may indicate that the version of the content is stored in the cluster and including an identifier of a content pod storing the version of the content. The computer program code may further include sets of instructions to send, by the application, the content request to the content pod storing the version of the content. The computer program code may further include sets of instructions to receive, by the application, the version of the content. The version of the content may be received by the application without querying the database for the version of the content.

Some embodiments provide a computer-implemented method. The method may comprise generating, by an application executing on a pod in a container, a content request for a particular version of content. The container may be an instance of an image executable by the pod. The pod being in a cluster comprising a plurality of pods, The image may be usable to generate replicas of the container for executing the application. The method may further comprise sending, by the application, a request including an identifier of the version of the content to a repository in the cluster. The repository may determine, using the identifier, whether the version of the content is stored in the cluster or stored at a database in a different cluster. The method may further comprise receiving, by the application, a response from the repository. The response may indicate that the version of the content is stored in the cluster and the response may include an identifier of a content pod storing the version of the content. The method may further comprise sending, by the application, the content request to the content pod storing the version of the content. The method may further comprise receiving, by the application, the version of the content. The version of the content may be received by the application without querying the database for the version of the content.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

Cluster Architecture and Pod Functionality

Figure 1:
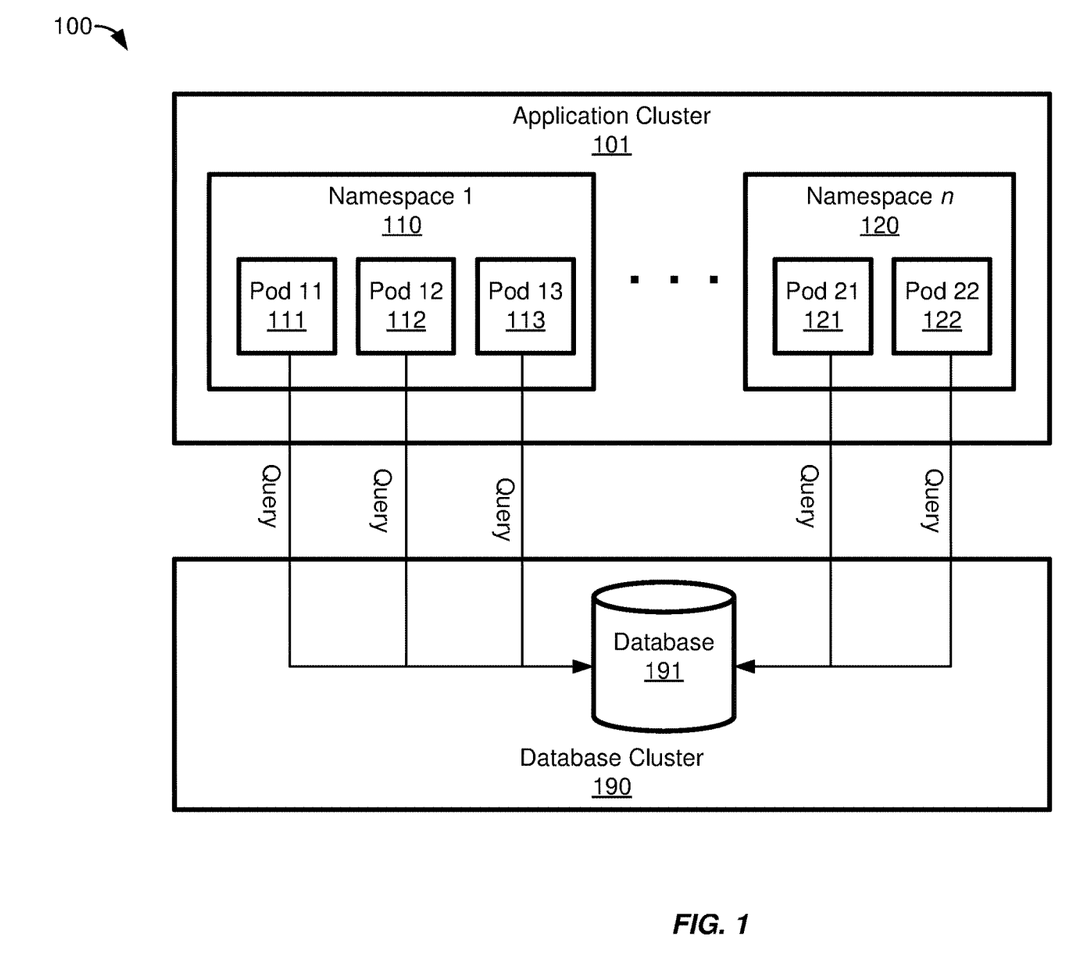
FIG. 1 shows a diagram of pods in an application cluster sending queries to a database in a database cluster, according to some embodiments.

As mentioned above, application may being run on a pod within a cluster. FIG. 1 shows a diagram 100 of pods 111-113 in an application cluster 101 sending queries to a database 191 in a database cluster 191, according to some embodiments. The application cluster 101 may be implemented on a cloud platform, for example. A pod management framework (not shown in FIG. 1) may handle load balancing, storage mounting and orchestration, pod creation and removal, and CPU and memory allocation, for the application cluster 101.

In FIG. 1 the application cluster 101 includes a first "namespace 1" 101 and a second "namespace n" 120. The application cluster 101 may include a number of other namespaces as indicated by the ellipsis. These "namespaces" represent groupings of pods. Each namespace may run a different version of the application software. "Namespace 1" 110 includes three pods, "Pod 11" 111, "Pod 12" 112, "Pod 13" 113. "Namespace n" 120 includes two pods, "Pod 21" 121 and "Pod 22" 122. The numbers of pods shown is for simplicity of illustration. The numbers of pods within a namespace may scale up or down to meet the load on the pod's application as determined by the framework.

As shown in FIG. 1, the pods 111-113, 121, and 122 may send queries to the database 191 on a database cluster 190. The database 191 may be accessible by the pods in the application cluster 101 using a network connection. The pods may query for information that is frequently updated or they may query for data that does not change (i.e., it is immutable). As described below with respect to FIG. 2, the application cluster 101 may store some versions of immutable content in pods of the application cluster 101 and include a repository that may be called to determine whether a particular version of the content is stored on a pod of the application cluster 101, and which type of pod. The applications executing on the pod may not need to query the database 191 over the network connection in cases where the content being queried is stored at the application cluster 101. Instead, the pod may call the repository and retrieve the content from a local pod within the cluster without querying the database 191.

Storing various versions of immutable content directly into the filesystem of the applications running on the pods of the application cluster 101 improves performance compared to accessing the database 191 as there may be greater latency over the network used to access the database 191. Thus, the potential for a bottleneck at the database is decreased as in situations where the framework creates additional pods in response to increased application demand, which results in additional applications making requests for a particular version of content, additional pods serving that content may also be created to handle that demand instead of the demand being placed on the database 191.

Figure 2:
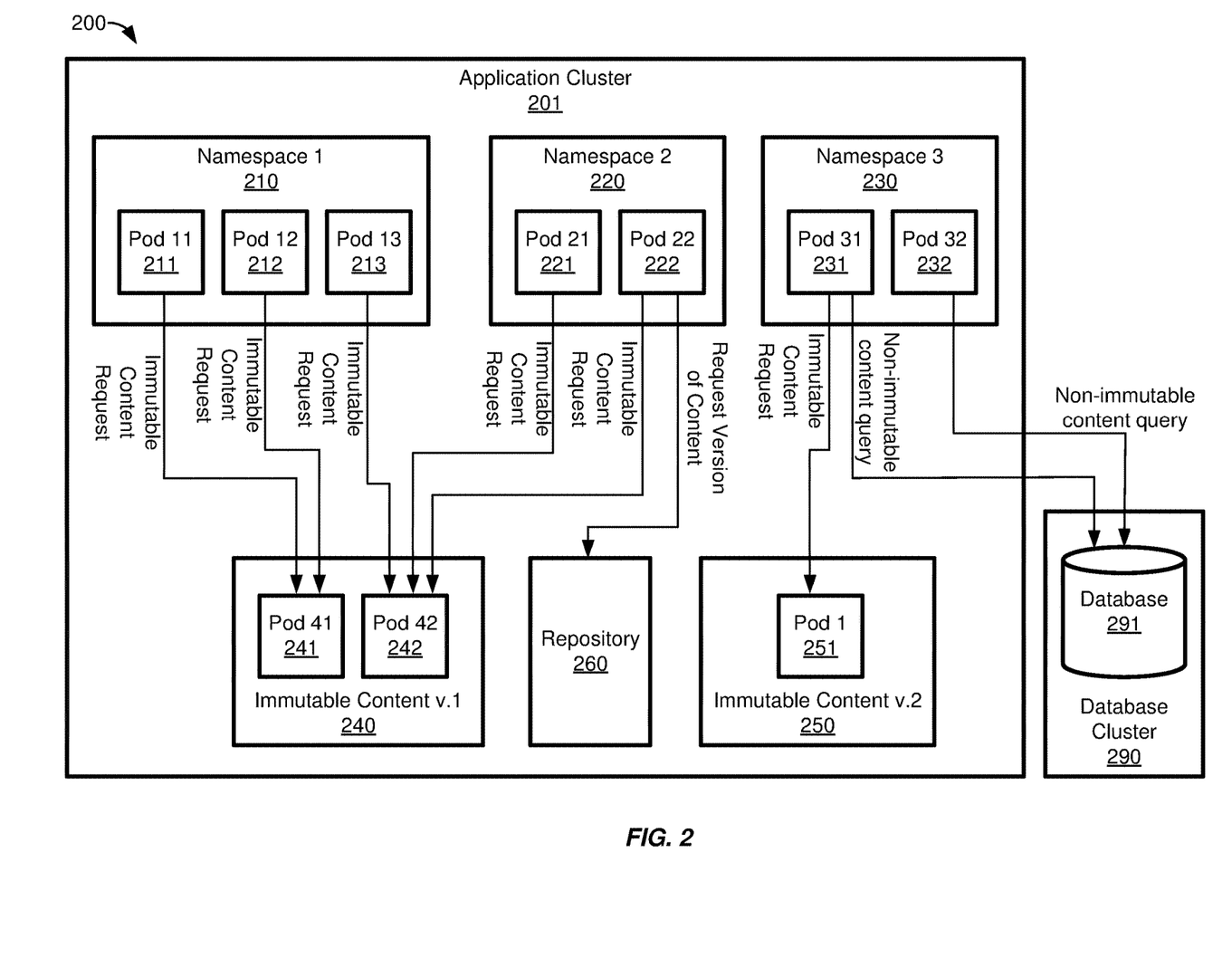
FIG. 2 shows a diagram of pods in an application cluster sending requests for immutable content to pods of immutable content clusters and queries for non-immutable content to a database in a database cluster, according to some embodiments.

FIG. 2 shows a diagram 200 of pods in an application cluster 201 sending requests for immutable content to pods of immutable content clusters 240, 250 and queries for non-immutable content to a database 291 in a database cluster 290, according to some embodiments. The diagram 200 shows further details of diagram 100 in FIG. 1. The application cluster 201 may be configured similar to the application cluster 101 of FIG. 1 except for differences discussed below. For instance, pods storing immutable content and requests from the pods for immutable content are shown in FIG. 2 while these are not shown in FIG. 1.

As shown in FIG. 2, the application cluster includes 201 three namespaces, "namespace 1" 210, "namespace 2" 220, and "namespace 3" 230. "Namespace 1" 210 includes "pod 11" 211, "pod 12" 212, "pod 13" 213. "Namespace 2" 220 includes "pod 21" 221 and "pod 22" 222. "Namespace 3" 230 includes "pod 231" and "pod 32" 232. The application cluster 201 also includes namespaces including pods that store immutable content, including "immutable content v. 1" 240 and "immutable content v. 2" 250. The namespace "immutable content v. 1" 240 includes "pod 41" 241 and "pod 42" 242 which may store version 1 (v. 1) of a particular type of immutable content and the namespace "immutable content v. 2" 250 includes "pod 251" 251 which may store version 2 (v. 2) of the particular type of immutable content. The immutable content may be different versions of configuration metadata for scoping a cloud-based application, for example.

The application cluster 201 further includes a repository 260. The repository 260 may register images of different versions of different types of content stored by pods on the application cluster 201. The repository 260 may be configured to perform target resolution to determine the type of pod storing a requested version of content. The applications of pods 211-213, 221, 222, 231, and 232 may be configured to send a request to the repository 260 including an identifier of a particular version of content and the repository 260 may reply with an indication of whether that particular version is stored by a pod within the application cluster 201 (e.g., pod 241, 242, or 251). The response from the repository 260 also indicates which type of pod to request the version of the content from (e.g., a pod 241/242 in namespace 240 or a pod 251 in namespace 250). If the version of the content is not stored on the application cluster 201 then the applications of the pods may query the database 291 in the database cluster 290 over a network.

To reduce load on the database 191, an image may be created for content that is immutable and pods storing that content may be created based on that image and run on the application cluster 201. For data that is not immutable (e.g., the data is updated) it may be inefficient to create an image since the data may change frequently (e.g., the database is written to) and it may be necessary to communicate with the database to determine whether the content has changed or not. Some features and advantages of storing immutable content on scalable pods is that response times for retrieving the data may be shorter compared to querying a database over a network and resource efficiency is improved (and costs are reduced) compared to providing additional or faster hardware for the database. The scaling up and down of the immutable content pods may be handled by the cluster framework (e.g., Kubernetes®).

Caching

The content pods serving immutable content may also be configured to cache the results of the queries on the content pod. This is advantageous as it allows for memory used to be controlled by the pod such that the size of the cache can be dynamically managed in an out of memory safe way. In embodiments where the immutable content is stored as a JSON file, the JSON result may not be stringified or parsed because the object will be stored in the main memory. Furthermore, the cache in the memory of the pod may be accessed by several processing threads (e.g., Go threads), meaning that queries can be requested by several application pods. Because the pod's cache is in memory and the objects of the content are directly held in memory then the performance of a query for that same content may be substantially improved as the overhead of caching may be minimal while performance gains may be about 1 second faster than without caching.

Image Structure and Creation

Figure 3:
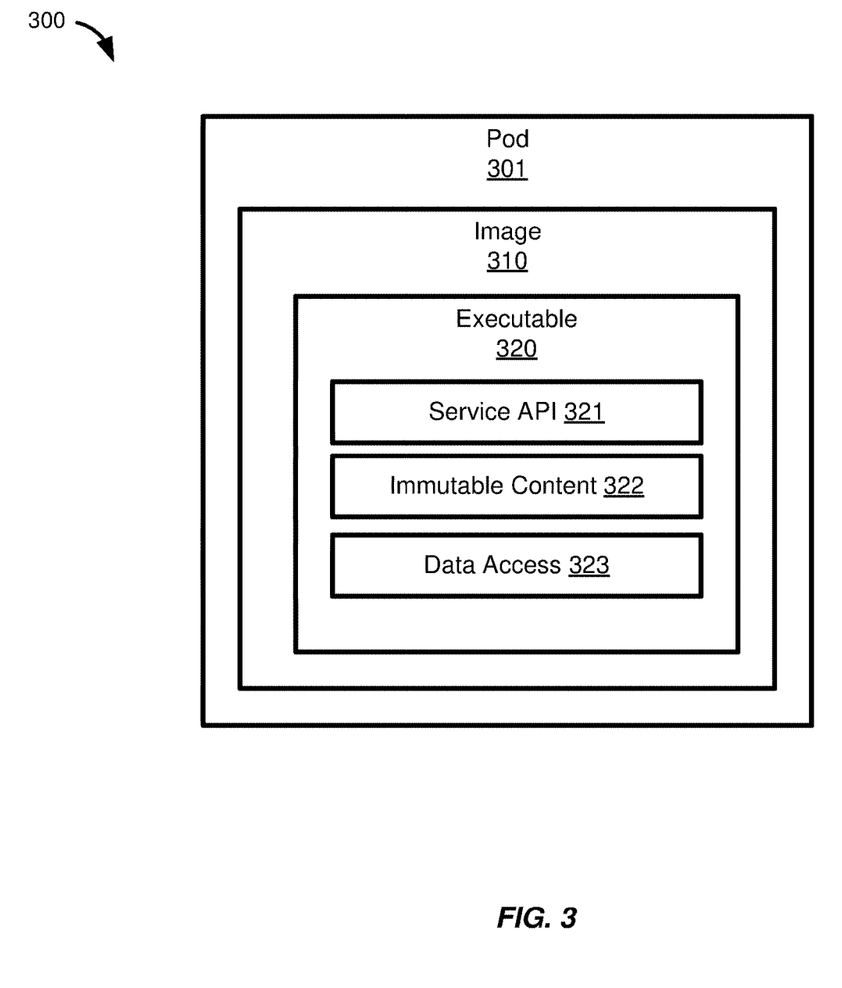
FIG. 3 shows a diagram of a pod and an image, according to some embodiments.

FIG. 3 shows a diagram 300 of a pod 301 and an image 310, according to some embodiments. The pod 301 includes an image 310 which may be executed as a containerized application. In some embodiments the image 310 may be a Docker image. The pod may share storage and have an IP address within a cluster of pods. The image 310 may be a template having instructions that can be used to build any number of containers based on that image 310. The image 310 may include an executable portion 320 (e.g., computer program code) as well as other elements used to run the application such as configurations, dependencies, libraries, filesystems, etc.

The executable portion 320 of the image 310 includes a service API 321, immutable content 322 (e.g., a particular version of a particular type of content), and a data access component (e.g., layer) 323. In some embodiments the executable portion 320 may be written in a multi-threading language, such as Go.

The service API 320 is configured to be called by the application pods (e.g., using a request/response). The service API 321 may use HTTP or a Remote Procedure Call (RPC) such as gRPC.

The immutable content 322 contains read-only data for a particular version of content (e.g., a particular version of configuration metadata). The immutable content 322 may be stored in the filesystem (not shown in FIG. 3) of the pod 301.

The service API is configured to receive a request for content and delegate the request to the data access component 323, which is configured to return the corresponding result (the content) from the filesystem. In some embodiments the implementation of the data access 323 to fetch the data may be done via a local index. In some embodiments the implementation of the data access 323 may use a database file (e.g., database engine). For example. The data access 323 may use an SQLite database file which enables the service API 321 to support a set of where condition feature, similar to a database service. The database file may be created when the image 310 is created. Creation of the image 310 is described below.

Creation of image 310 may be triggered when a new version of the content is released. The files that provide this new content version may be pushed into a dedicated repository and initiate an image creation process. After the image is created, an application on a pod may be executed using that image and the new version of the content may be served from that pod.

To create an image the new version of the content may be retrieved from the repository and a data access file 323 (e.g., an SQLite database file) may be created from the content. After creating the data access file 323 the image 310 may be created including the data access file 323 and the executable portion 320, including the service API 321, which comprises program code (e.g., Go language coding) configured to serve client requests. The executable portion 320 of the image 310 may include internal APIs, such as an SQLite internal API for a Go language service API, for example.

The created image 310 may be stored in an image artifactory. Once stored, the image 310 may be registered with a repository such as the repository 260 in FIG. 2. The repository may be implemented as operator able to start a pod at runtime and able to route a request for a particular version of content from an application to a type of pod created based on an image storing that particular version of content. The repository can perform target resolution to find the correct type of pod for the requested version of content.

In situations where the load (demand) on the application increases such that the number of pods for the application is scaled up, new pods for a particular version of content may be scaled up accordingly. The determination of whether to scale up by replicating pods may be based on memory and CPU consumption metrics of the pod.

EXAMPLE PROCESS

Figure 4:
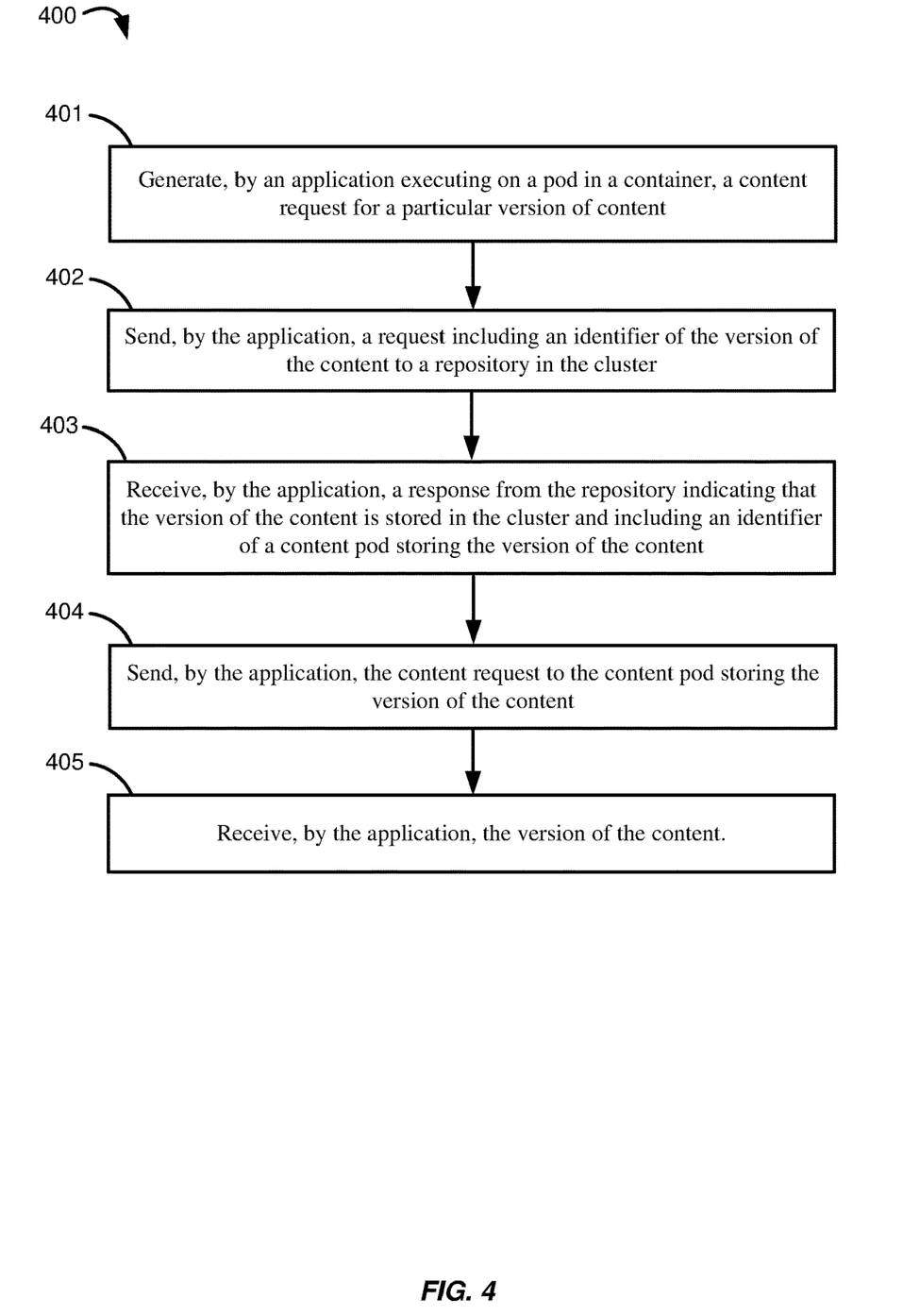
FIG. 4 shows a flow chart of a process for retrieving immutable content, according to some embodiments.

FIG. 4 shows a flow chart of a process 400 for retrieving immutable content, according to some embodiments. The process 400 may be implemented by a computer system (e.g., a combination of one or more server computers) operating a cluster of pods, for example.

At step 401 the process may generate, by an application executing on a pod in a container, a content request for a particular version of content. The container may be an instance of an image executable by the pod. The pod may be in a cluster comprising a plurality of pods. The image may be usable to generate replicas of the container for executing the application. In some embodiments the content of the particular version is immutable such that a change to the content would result in a different version of the content. In some embodiments the cluster includes a second content pod storing a second version of the immutable content.

In some embodiments the image is a docker image. In some embodiments the pod is a Kubernetes pod. In some embodiments the cluster is a Kubernetes cluster. In some embodiments the pod executing the application may be replicated based on the image in response to increased demand for the application. In some embodiments the content pod may be replicated based on a content image in response to increased demand for the version of the content, At step 402 the process may send, by the application, a request including an identifier of the version of the content to a repository in the cluster. The repository may determine, using the identifier, whether the version of the content is stored in the cluster or stored at a database in a different cluster.

At step 403 the process may receive, by the application, a response from the repository indicating that the version of the content is stored in the cluster and including an identifier of a content pod storing the version of the content.

At step 404 the process may send, by the application, the content request to the content pod storing the version of the content. In some embodiments the content pod executes a content container based on a content image for the version of the content. The content image may comprise a filesystem storing the version of the content and comprising a data access file for accessing the filesystem. In some embodiments the data access file is an SQLite file At step 405 the process may receive, by the application, the version of the content. In some embodiments the version of the content being received by the application without querying the database for the version of the content.

Measured Performance Improvement

The inventors implemented the technique of placing immutable content in a pod described herein and measured performance compared to the system without these techniques that accesses immutable content from a database. The use of the immutable content pod improved response time by between 12 minutes and 3.5 minutes for a particular version of immutable content.

Example Hardware

Figure 5:
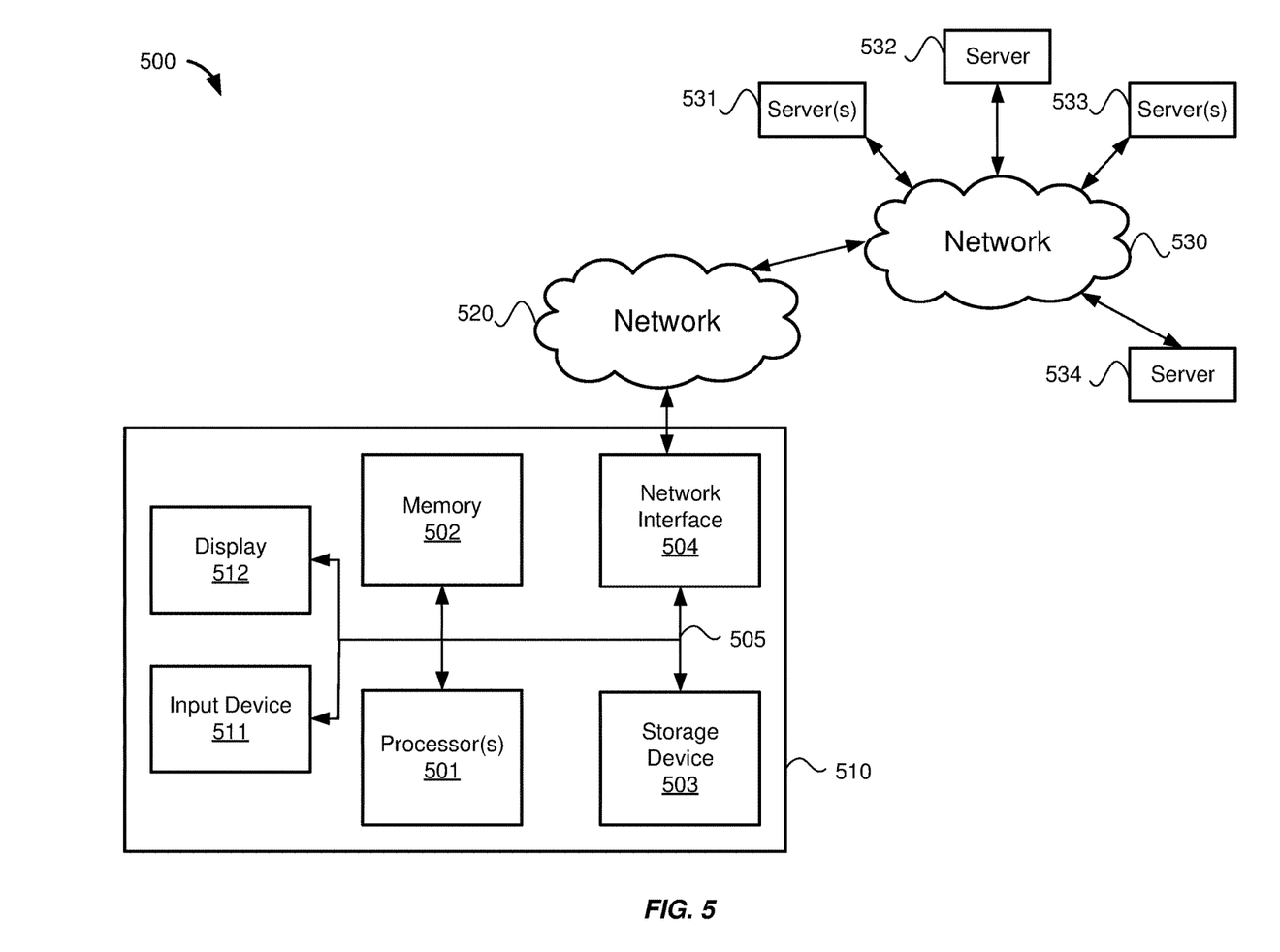
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (compute reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

Example Embodiments

Various example embodiments implementing the techniques discussed above are described below.

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to generate, by an application executing on a pod in a container, a content request for a particular version of content. The container may be an instance of an image executable by the pod. The pod may be in a cluster comprising a plurality of pods. The image may be usable to generate replicas of the container for executing the application. The instructions may be further executable by the one or more processors to send, by the application, a request including an identifier of the version of the content to a repository in the cluster. The repository may determine, using the identifier, whether the version of the content is stored in the cluster or stored at a database in a different cluster. The instructions may be further executable by the one or more processors to receive, by the application, a response from the repository. The response may indicate that the version of the content is stored in the cluster and the response may include an identifier of a content pod storing the version of the content. The instructions may be further executable by the one or more processors to send, by the application, the content request to the content pod storing the version of the content. The instructions may be further executable by the one or more processors to receive, by the application, the version of the content, the version of the content being received by the application without querying the database for the version of the content.

In some embodiments of the computer system the content of the particular version is immutable, wherein a change to the content would result in a different version of the content.

In some embodiments of the computer system the cluster includes a second content pod storing a second version of the immutable content.

In some embodiments of the computer system the content pod executes a content container based on a content image for the version of the content, the content image comprising a filesystem storing the version of the content and comprising a data access file for accessing the filesystem.

In some embodiments of the computer system the data access file is an SQLite file.

In some embodiments of the computer system the instructions may be further executable to send, by the application, a second request including a second identifier of second content to the repository in the cluster, where the second content is not immutable. The repository may determine, using the second identifier, that the second content is stored at the database. The instructions may be further executable to receive, by the application, a second response from the repository. The second response may indicate that the second content is stored at the database. The instructions may be further executable to send, by the application, a second content request to the database.

In some embodiments of the computer system the image is a docker image, the pod is a Kubernetes pod, and the cluster is a Kubernetes cluster. In such embodiments the pod executing the application may be replicated based on the image in response to increased demand for the application. In such embodiments the content pod may be replicated based on a content image in response to increased demand for the version of the content.

Some embodiments provide one or more non-transitory computer-readable medium storing computer program code comprising sets of instructions. The computer program code may include sets of instructions to generate, by an application executable on a pod in a container, a content request for a particular version of content. The container may be an instance of an image executable by the pod. The pod being in a cluster comprising a plurality of pods, the image usable to generate replicas of the container for executing the application. The computer program code may further include sets of instructions to send, by the application, a request including an identifier of the version of the content to a repository in the cluster. The repository may determine, using the identifier, whether the version of the content is stored in the cluster or stored at a database in a different cluster. The computer program code may further include sets of instructions to receive, by the application, a response from the repository. The response may indicate that the version of the content is stored in the cluster and including an identifier of a content pod storing the version of the content. The computer program code may further include sets of instructions to send, by the application, the content request to the content pod storing the version of the content. The computer program code may further include sets of instructions to receive, by the application, the version of the content. The version of the content may be received by the application without querying the database for the version of the content.

In some embodiments of the non-transitory computer-readable medium the content of the particular version is immutable, where a change to the content would result in a different version of the content.

In some embodiments of the non-transitory computer-readable medium the cluster includes a second content pod storing a second version of the immutable content.

In some embodiments of the non-transitory computer-readable medium the content pod executes a content container based on a content image for the version of the content, the content image comprising a filesystem storing the version of the content and comprising a data access file for accessing the filesystem.

In some embodiments of the non-transitory computer-readable medium the data access file is an SQLite file.

In some embodiments of the non-transitory computer-readable medium the computer program code further comprises sets instructions to send, by the application, a second request including a second identifier of second content to the repository in the cluster. The second content may not be immutable. The repository may determine, using the second identifier, that the second content is stored at the database. The program code may further comprise sets instructions to receive, by the application, a second response from the repository. The second response indicating that the second content is stored at the database. The program code may further comprise sets instructions to send, by the application, a second content request to the database.

In some embodiments of the non-transitory computer-readable medium the image is a docker image, the pod is a Kubernetes pod, and the cluster is a Kubernetes cluster. In such embodiments the pod executing the application may be replicated based on the image in response to increased demand for the application. In such embodiments the content pod may be replicated based on a content image in response to increased demand for the version of the content.

Some embodiments provide a computer-implemented method. The method may comprise generating, by an application executing on a pod in a container, a content request for a particular version of content. The container may be an instance of an image executable by the pod. The pod being in a cluster comprising a plurality of pods, The image may be usable to generate replicas of the container for executing the application. The method may further comprise sending, by the application, a request including an identifier of the version of the content to a repository in the cluster. The repository may determine, using the identifier, whether the version of the content is stored in the cluster or stored at a database in a different cluster. The method may further comprise receiving, by the application, a response from the repository. The response may indicate that the version of the content is stored in the cluster and the response may include an identifier of a content pod storing the version of the content. The method may further comprise sending, by the application, the content request to the content pod storing the version of the content. The method may further comprise receiving, by the application, the version of the content. The version of the content may be received by the application without querying the database for the version of the content.

In some embodiments of the computer-implemented method the content of the particular version is immutable, where a change to the content would result in a different version of the content.

In some embodiments of the computer-implemented method the cluster includes a second content pod storing a second version of the immutable content.

In some embodiments of the computer-implemented method the content pod executes a content container based on a content image for the version of the content. The content image may comprise a filesystem storing the version of the content and comprising a data access file for accessing the filesystem, where the data access file is an SQLite file.

In some embodiments the computer-implemented method further comprises sending, by the application, a second request including a second identifier of second content to the repository in the cluster. The second content may not be immutable. The repository may determine, using the second identifier, that the second content is stored at the database. In such embodiments the computer-implemented method may further comprise receiving, by the application, a second response from the repository. The second response may indicate that the second content is stored at the database. In such embodiments the computer-implemented method may further comprise send, by the application, a second content request to the database.

In some embodiments of the computer-implemented method the image is a docker image, the pod is a Kubernetes pod, and the cluster is a Kubernetes cluster. In such embodiments the pod executing the application may be replicated based on the image in response to increased demand for the application. In such embodiments the content pod may be replicated based on a content image in response to increased demand for the version of the content.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more non-transitory machine-readable media coupled to the one or more processors and storing computer program code comprising sets of instructions executable by the one or more processors to:
generate, by an application executing on a pod in a container, a content request for a particular version of content, the container being an instance of an image executable by the pod, the pod being in a cluster comprising a plurality of pods, the image usable to generate replicas of the container for executing the application;
send, by the application, a request including an identifier of the particular version of the content to a repository in the cluster, the repository determining, using the identifier, whether the particular version of the content is stored in the cluster or stored at a database in a different cluster;
receive, by the application, a response from the repository, the response indicating that the particular version of the content is stored in the cluster and including an identifier of a content pod storing the particular version of the content;
send, by the application, the content request to the content pod storing the particular version of the content; and
receive, by the application, the particular version of the content, the particular version of the content being received by the application without querying the database for the particular version of the content.

2. The computer system of claim 1, wherein the content of the particular version is immutable, wherein a change to the content would result in a different version of the content.

3. The computer system of claim 2, wherein the cluster includes a second content pod storing a second version of the immutable content.

4. The computer system of claim 1, wherein the content pod executes a content container based on a content image for the particular version of the content, the content image comprising a filesystem storing the particular version of the content and comprising a data access file for accessing the filesystem.

5. The computer system of claim 4, wherein the data access file is an SQLite file.

6. The computer system of claim 1, wherein the computer program code further comprises sets of instructions executable by the one or more processors to:
send, by the application, a second request including a second identifier of second content to the repository in the cluster, the second content not being immutable, the repository determining, using the second identifier, that the second content is stored at the database;
receive, by the application, a second response from the repository, the second response indicating that the second content is stored at the database;
send, by the application, a second content request to the database.

7. The computer system of claim 1, wherein the image is a docker image, wherein the pod is a Kubernetes pod, wherein the cluster is a Kubernetes cluster, wherein the pod executing the application is replicated based on the image in response to increased demand for the application, and wherein the content pod is replicated based on a content image in response to increased demand for the particular version of the content.

8. A non-transitory computer-readable medium storing computer program code comprising sets of instructions to:
generate, by an application executable on a pod in a container, a content request for a particular version of content, the container being an instance of an image executable by the pod, the pod being in a cluster comprising a plurality of pods, the image usable to generate replicas of the container for executing the application;
send, by the application, a request including an identifier of the particular version of the content to a repository in the cluster, the repository determining, using the identifier, whether the particular version of the content is stored in the cluster or stored at a database in a different cluster;
receive, by the application, a response from the repository, the response indicating that the particular version of the content is stored in the cluster and including an identifier of a content pod storing the particular version of the content;
send, by the application, the content request to the content pod storing the particular version of the content; and
receive, by the application, the particular version of the content, the particular version of the content being received by the application without querying the database for the particular version of the content.

9. The non-transitory computer-readable medium of claim 8, wherein the content of the particular version is immutable, wherein a change to the content would result in a different version of the content.

10. The non-transitory computer-readable medium of claim 9, wherein the cluster includes a second content pod storing a second version of the immutable content.

11. The non-transitory computer-readable medium of claim 8, wherein the content pod executes a content container based on a content image for the particular version of the content, the content image comprising a filesystem storing the particular version of the content and comprising a data access file for accessing the filesystem.

12. The non-transitory computer-readable medium of claim 11, wherein the data access file is an SQLite file.

13. The non-transitory computer-readable medium of claim 8, wherein the computer program code further comprises sets of instructions to:
send, by the application, a second request including a second identifier of second content to the repository in the cluster, the second content not being immutable, the repository determining, using the second identifier, that the second content is stored at the database;
receive, by the application, a second response from the repository, the second response indicating that the second content is stored at the database;
send, by the application, a second content request to the database.

14. The non-transitory computer-readable medium of claim 8, wherein the image is a docker image, wherein the pod is a Kubernetes pod, wherein the cluster is a Kubernetes cluster, wherein the pod executing the application is replicated based on the image in response to increased demand for the application, and wherein the content pod is replicated based on a content image in response to increased demand for the particular version of the content.

15. A computer-implemented method, comprising:
generating, by an application executing on a pod in a container, a content request for a particular version of content, the container being an instance of an image executable by the pod, the pod being in a cluster comprising a plurality of pods, the image usable to generate replicas of the container for executing the application;
sending, by the application, a request including an identifier of the particular version of the content to a repository in the cluster, the repository determining, using the identifier, whether the particular version of the content is stored in the cluster or stored at a database in a different cluster;
receiving, by the application, a response from the repository, the response indicating that the particular version of the content is stored in the cluster and including an identifier of a content pod storing the particular version of the content;
sending, by the application, the content request to the content pod storing the particular version of the content; and
receiving, by the application, the particular version of the content, the particular version of the content being received by the application without querying the database for the particular version of the content.

16. The computer-implemented method of claim 15, wherein the content of the particular version is immutable, wherein a change to the content would result in a different version of the content.

17. The computer-implemented method of claim 16, wherein the cluster includes a second content pod storing a second version of the immutable content.

18. The computer-implemented method of claim 15, wherein the content pod executes a content container based on a content image for the particular version of the content, the content image comprising a filesystem storing the particular version of the content and comprising a data access file for accessing the filesystem, wherein the data access file is an SQLite file.

19. The computer-implemented method of claim 15, further comprising:
sending, by the application, a second request including a second identifier of second content to the repository in the cluster, the second content not being immutable, the repository determining, using the second identifier, that the second content is stored at the database;
receiving, by the application, a second response from the repository, the second response indicating that the second content is stored at the database;
sending, by the application, a second content request to the database.

20. The computer-implemented method of claim 15, wherein the image is a docker image, wherein the pod is a Kubernetes pod, wherein the cluster is a Kubernetes cluster, wherein the pod executing the application is replicated based on the image in response to increased demand for the application, and wherein the content pod is replicated based on a content image in response to increased demand for the particular version of the content.

* * * * *